Patented Dec. 19, 1944

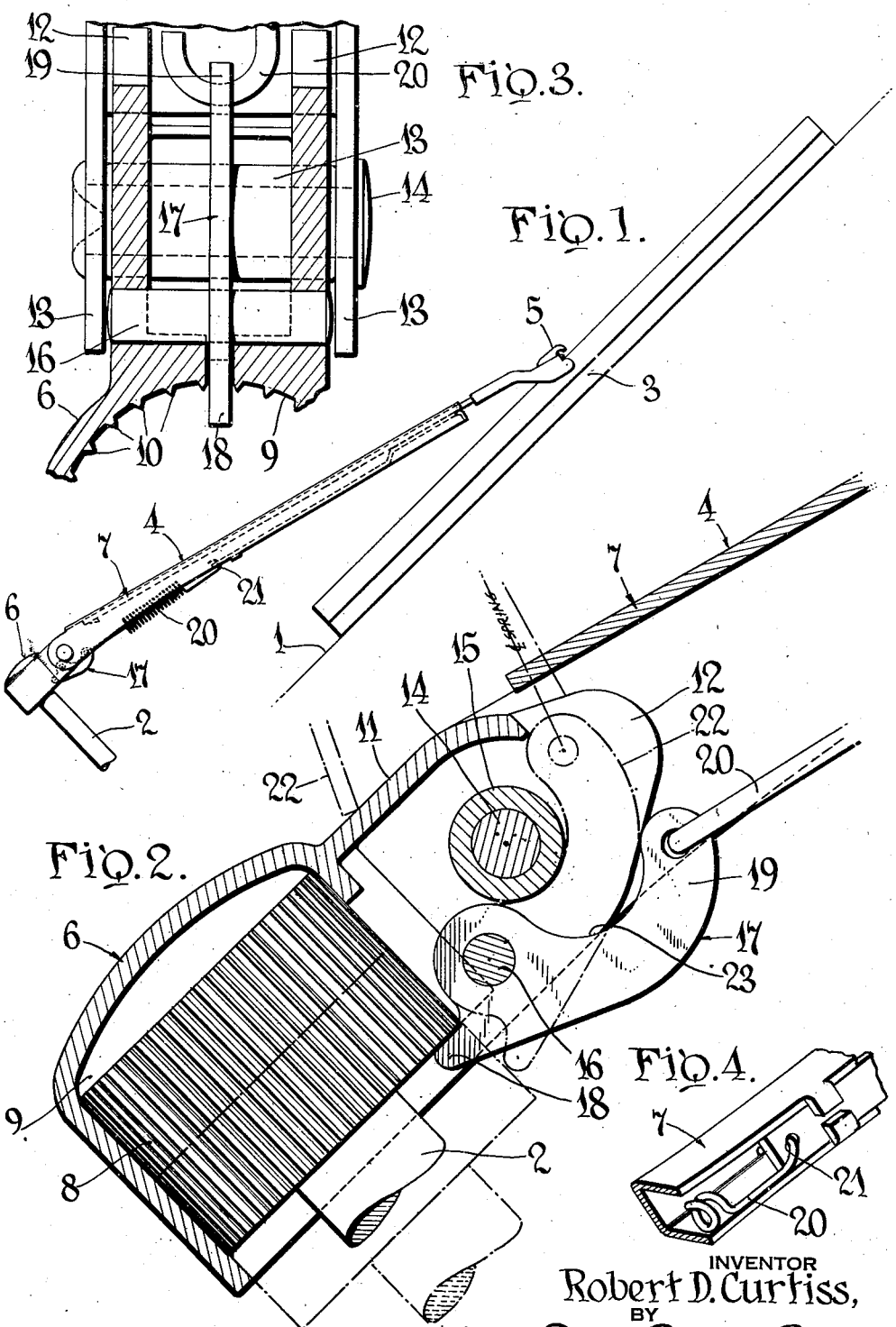

2,365,251

UNITED STATES PATENT OFFICE 2,365,251

WINDSHIELD CLEANER

Robert D. Curtiss, Buffalo, N. Y., assignor to Trico Products Corporation, Buffalo, N. Y.

Application September 17, 1942, Serial No. 458,630

8 Claims. (Cl. 15—255)

This invention relates to windshield cleaners and more particularly to the wiper carrying arm and the manner for mounting it on an actuating shaft.

The invention has for its object to provide a wiper arm which may be quickly and easily mounted on or dismounted from its actuating shaft.

The invention further resides in a simple, rugged construction whereby economy in manufacture is maintained without sacrificing efficiency and durability.

In the drawing illustrating one embodiment of the invention:

Fig. 1 is a side elevational view of a windshield cleaner shown mounted with respect to a windshield;

Fig. 2 is an enlarged sectional view through the mounting portion of the wiper arm;

Fig. 3 is an enlarged fragmentary bottom plan view with parts broken away; and

Fig. 4 is a fragmentary perspective view of a portion of the wiper arm.

Referring more particularly to the details in the drawing, numeral 1 designates the windshield of a motor vehicle upon which is mounted for oscillation thereover by an actuating shaft 2 of a windshield cleaner motor (not shown), a wiper blade 3 connected to its wiper arm 4 by a terminal wiper engaging means comprising a hook 5. The wiper arm 4 comprises an inner mounting section 6 and an outer blade carrying section 7 pivotally mounted thereon.

To provide for rotative adjustments when mounting the inner section 6 on the actuating shaft 2 the shaft is provided with an enlarged serrated head portion 8 while the inner mounting section 6 is provided with a socket or recess 9 having ridges 10 to slidingly interfit and interlock with the serrations on the head 8, thus positioning the wiper arm securely on the shaft in its selected position.

An integral channel section 11 having a pair of short side walls 12 extends from the mounting section 6 to which spaced ears 13 of the blade carrying section 7 are pivoted by means of a pivot 14 having a bearing 15. Between the walls 12 there is pivotally mounted at 16 a latch 17. This pivot 16 may be located elsewhere but in this preferred embodiment is located in close proximity to the pivot 14 of the wiper carrying arm and at a point between the pivot 14 and the head 8. The latch 17 has a keeper portion 18 close to its pivot 16 for lockingly engaging a shoulder as provided by the inner end of the serrated head 8, and to actuate the keeper 18 into and out of locking engagement with said head, an actuating arm or lever 19 is provided having resilient means in the form of a coil spring 20 connecting the outer end of the arm 19 to a point 21 on the wiper carrying arm 7 thereby serving in addition to the latch actuation as a means for uring the wiper into contact with the windshield.

In its operation, assuming the wiper arm to be mounted upon its shaft and the wiper blade in its operative position against the windshield as urged by the coil spring and shown in Fig. 1, it is desired to dismount the wiper arm from the shaft. The outer end of the wiper carrying section is rotated in a counterclockwise direction away from the windshield to the dotted line position 22, shown in Fig. 2. The latch likewise pivots in a counterclockwise direction following the urge of the spring 20, thereby swinging the keeper clear of the head and allowing the mounting section to be removed from the head. The locations of the pivots 14 and 16, as described above, allow the arm 7 to be swung outwardly a reasonable degree for ordinary purposes such as windshield cleaning, wiper replacing, etc., without releasing the mounting section for dismounting from the shaft. The close proximity of the keeper to the pivot 16 and the longer length of the arm 19 allow a maximum amount of counterclockwise rotation of the arm as compared to the minimum rotation of the keeper 18 to clear it from the path of the head 8 for dismounting purposes. To assemble, the above proceeding is reversed. Because of the confined space in which it has to operate, the arm 19 of the latch 17 is cut away at 23 to allow its outer end to swing far enough around the bearing 15 to clear the keeper 18 from the path of withdrawal of the head.

The above description is merely illustrative of the inventive principles involved, which may be applied to other physical embodiments without departing from the scope and spirit of the invention claimed.

What is claimed is:

1. A windshield wiper comprising a drive shaft engaging portion having a short channeled section extending therefrom, a wiper carrying portion having a relatively longer channeled section pivotally mounted on said first portion for movement in a plane perpendicular to an associated windshield, a latch having a shaft engaging part and an actuating arm pivotally mounted on the short channeled section of the shaft engaging portion, a coil spring connected at one end to the outer end of said actuating arm and anchored at its other end to said wiper carrying portion, the actuating arm extending toward the anchored end of the spring with the line of spring force acting radially of the latch pivot and moving thereabout along with the actuating arm during movement of the wiper carrying section away from the associated windshield to disengage the latch part.

2. A windshield wiper comprising an inner section, a wiper carrying section, a pin pivotally mounting the wiper carrying section on said inner section for movements in a plane perpendicular to an associated windshield, a latch pivotally mounted on said inner section at the inner side of said pivot pin, said latch having a shaft engaging keeper and an actuating arm, and a coil spring connecting under tension the outer end of said actuating arm and a remote point on said wiper carrying section, said actuating arm having an intermediate portion offset from a line drawn through the pivotal axis of said latch and point of spring connection to the actuating arm to receive the arm pivot in disengaging the keeper.

3. A windshield wiper comprising an inner section, a wiper carrying section, a pin pivotally mounting said wiper carrying section on said inner section for movements in a plane perpendicular to an associated windshield, an arm pivoted on said inner section at the inner side of the pivot pin and having a portion extending to the outer side of said pivot pin, a coiled spring anchored at one end to said wiper carrying section and connected at its other end to the outer end of said arm under tension, whereby the arm will move with the coiled spring as a unit about the pivotal axis of said arm during pivotal movement of said wiper carrying section, said arm portion having an intermediate part offset to receive the pivot pin to avoid breaking the line of spring force from the arm pivotal axis to the coil spring anchorage on said wiper carrying section.

4. A windshield wiper arm having a shaft engaging portion, a wiper carrying portion pivotally mounted thereon for movement toward and from an associated windshield, a shaft engaging latch pivotally mounted on said first portion, and latch disengaging means operatively connecting the second portion to said latch and operable by and during such pivotal movement of the wiper carrying portion to swing the latch in the same direction and thereby disengage the latch from such shaft.

5. A windshield wiper arm having a shaft engaging portion, a wiper carrying portion pivotally mounted thereon for movement toward and from an associated windshield, a shaft engaging latch pivotally mounted on said first portion to one side of the first pivot and having an actuating arm, and a tension member connected at its inner end to the actuating arm and at its opposite end to said wiper carrying portion at a point outwardly beyond the pivotal mounting of the latter portion for movement with the actuating arm as a unit about the latch pivot, said latch being free to so move as a unit with the tension member whereby upon pivotal movement of said wiper carrying portion away from the windshield the actuating arm will move to disengage the latch.

6. A windshield wiper arm having a shaft engaging portion, a wiper carrying portion pivotally mounted thereon for movement toward and from an associated windshield, a shaft engaging latch pivotally mounted on said first portion adjacent the first pivot, and a coil spring anchored at one end on said second portion outwardly beyond the pivotal mounting of the latter and having its opposite end connected to a part of the latch to suspend such part under tension from the latch pivot for movement of the spring and the latch as a unit about the latch pivot when the wiper carrying portion is lifted from the windshield, the latch being free to move to its inoperative position during such unit movement.

7. A windshield wiper arm having a relatively short shaft engaging portion, a wiper carrying portion pivotally mounted thereon for movement to and from an associated windshield, a shaft engaging latch pivotally mounted on said first portion adjacent the first pivot and having an actuating arm, a resilient member acting in tension to connect the actuating arm to the wiper carrying portion at a point outwardly beyond the first pivot, said actuating arm and resilient member being free to swing as a unit about the axis of the latch pivot when the wiper carrying portion is lifted from the windshield, said latch having a keeper part disengageable from the shaft by and during such swinging of the unit.

8. A windshield wiper arm comprising a mounting section having a socket and a projecting channel portion, said socket adapted to be fitted over an enlarged end portion of a drive shaft, a wiper carrying section pivotally mounted on said channel portion and having a terminal wiper engaging means, a latch pivotally mounted between the side walls of said channel portion adjacent said pivotal mounting of said wiper carrying section and having a part lockingly engaging the enlarged end portion of the drive shaft, said latch also having an actuating arm, and resilient means operatively connecting under tension said actuating arm with said wiper carrying section at a point outwardly beyond the pivotal axis for the latter, said latch part being free to move with the resilient means as a unit for being actuated into and out of locking engagement with the drive shaft upon pivotal movement of said wiper carrying section about its pivotal axis.

ROBERT D. CURTISS.